(12) United States Patent
Yatsuya et al.

(10) Patent No.: US 11,994,284 B2
(45) Date of Patent: May 28, 2024

(54) WAVELENGTH CONVERSION MEMBER AND LIGHT SOURCE DEVICE PROVIDED THEREWITH

(71) Applicant: NGK SPARK PLUG CO., LTD., Nagoya (JP)

(72) Inventors: Yosuke Yatsuya, Nagoya (JP); Toshiyuki Sakurai, Nagoya (JP); Shohei Takaku, Nagoya (JP); Hiroki Yamauchi, Nagoya (JP); Tomoo Tanaka, Nagoya (JP); Hiroki Takeuchi, Nagoya (JP); Shinji Ban, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 0 days.

(21) Appl. No.: 18/245,275

(22) PCT Filed: Dec. 13, 2021

(86) PCT No.: PCT/JP2021/045813
§ 371 (c)(1),
(2) Date: Mar. 14, 2023

(87) PCT Pub. No.: WO2022/163175
PCT Pub. Date: Aug. 4, 2022

(65) Prior Publication Data
US 2023/0383926 A1   Nov. 30, 2023

(30) Foreign Application Priority Data
Jan. 28, 2021   (JP) .................................. 2021-011731

(51) Int. Cl.
*F21V 7/30* (2018.01)
*F21K 9/64* (2016.01)
*F21V 9/30* (2018.01)

(52) U.S. Cl.
CPC .................. *F21V 7/30* (2018.02); *F21K 9/64* (2016.08); *F21V 9/30* (2018.02)

(58) Field of Classification Search
CPC . F21K 9/64; F21V 9/30; H01L 33/505; H01L 33/503; F21S 41/176; C09K 11/025; C09K 11/02
See application file for complete search history.

(56) References Cited

U.S. PATENT DOCUMENTS

| | | |
|---|---|---|
| 2010/0033948 A1 | 2/2010 | Harbers et al. |
| 2011/0211344 A1 | 9/2011 | Harbers et al. |

(Continued)

FOREIGN PATENT DOCUMENTS

| | | | | |
|---|---|---|---|---|
| CN | 110017435 A | * | 7/2019 | ............... F21K 9/20 |
| CN | 110168279 A | * | 8/2019 | ......... C09K 11/7774 |

(Continued)

OTHER PUBLICATIONS

Innovation Q+ NPL Search (Year: 2003).*

(Continued)

*Primary Examiner* — Anabel Ton
(74) *Attorney, Agent, or Firm* — Stites & Harbison, PLLC; Jeffrey A. Haeberlin

(57) ABSTRACT

There is provided a wavelength conversion member including: a fluorescent body and a reflective film. The fluorescent body is configured to emit fluorescence by an excitation light and has an incident surface into which the excitation light comes and a rear surface which faces the incident surface. The reflective film is arranged on a side of the rear surface of the fluorescent body and includes a metal layer and ceramic particles dispersed in the metal layer. The ceramic particles are crystalline, and a melting point of the ceramic particles is higher than a melting point of a metal constructing the metal layer.

7 Claims, 2 Drawing Sheets

(56) References Cited

U.S. PATENT DOCUMENTS

| | | |
|---|---|---|
| 2015/0179537 A1 | 6/2015 | Shioji et al. |
| 2016/0245494 A1 | 8/2016 | Weber et al. |
| 2016/0247988 A1 | 8/2016 | Shioji et al. |
| 2019/0081452 A1 | 3/2019 | Miura et al. |

FOREIGN PATENT DOCUMENTS

| | | |
|---|---|---|
| JP | 2011-530789 A | 12/2011 |
| JP | 2015-144245 | 8/2015 |
| JP | 2016-534396 A | 11/2016 |
| JP | 2019-53130 A | 4/2019 |
| JP | 2019-159175 A | 9/2019 |

OTHER PUBLICATIONS

Japan Patent Office, International Search Report issued in corresponding Application No. PCT/JP2021/045813, mailed Mar. 1, 2022.
The International Bureau of WIPO, International Preliminary Report on Patentability issued in corresponding Application No. PCT/JP2021/045813, issued Jul. 31, 2023.
Japan Patent Office, Office Action (Notice of Reasons for Refusal) issued in corresponding Application No. 2022-578125, mailed Oct. 24, 2023.

\* cited by examiner

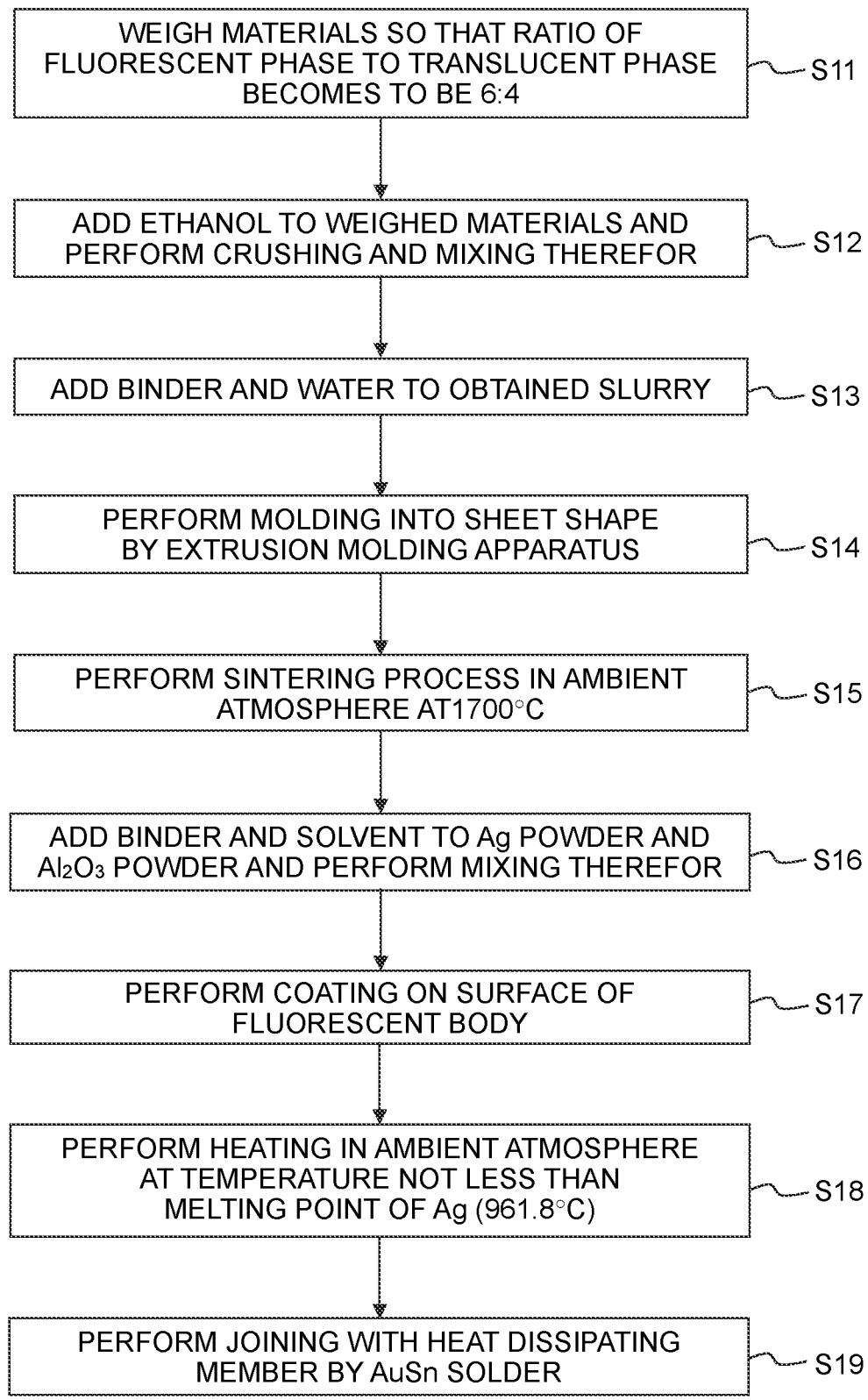

WAVELENGTH CONVERSION MEMBER AND LIGHT SOURCE DEVICE PROVIDED THEREWITH

REFERENCE TO RELATED APPLICATIONS

This application claims the benefit of priorities of Japanese Patent Application No. 2021-011731 filed on Jan. 28, 2021 and International Patent Application No. PCT/JP2021/045813 filed on Dec. 13, 2021, and the disclosures of Japanese Patent Application No. 2021-011731 and International Patent Application No. PCT/JP2021/045813 are incorporated herein by reference in their entities.

BACKGROUND ART

The present disclosure relates to a wavelength conversion member and a light source apparatus provided with the same.

There is known an optical member provided with a fluorescent body (phosphor), and a metallic reflective film baked on a surface of the fluorescent body and containing a glass component. By forming the reflective film by adding the glass component to a metal such as silver (Ag), etc., the wetting property of the reflective film with respect to the fluorescent body is enhanced.

DESCRIPTION

In a case that the reflective film is baked, heating is performed up to a temperature at which the glass component included in the metallic reflective film is softened. In this situation, since the fluidity of the softened glass component is heightened, the glass components aggregate and/or the glass component is largely distributed in the vicinity of the interface between the reflective film and the fluorescent body, in some cases. Further, in a case that the glass component fluidly moves up to the interface between the reflective film and the fluorescent body, there is such a fear that the fluorescent body and the glass react with each other. As a result, the property of a component of the fluorescent body is altered, which in turn lowers the reflectivity of the reflective film, in some cases.

An object of the present disclosure is to provide a technique of suppressing any weakening of the adhesion strength of the reflective film and of suppressing any lowering in the reflectivity of the reflective film.

According to an aspect of the present disclosure, there is provided a wavelength conversion member including: a fluorescent body emitting fluorescence by an excitation light and having an incident surface into which the excitation light comes and a rear surface which faces the incident surface; and a reflective film arranged on a side of the rear surface of the fluorescent body and including a metal layer and ceramic particles dispersed in the metal layer, wherein the ceramic particles are crystalline, and a melting point of the ceramic particles is higher than a melting point of a metal constructing the metal layer.

According to the above-described aspect, the reflective film has the metal layer and the crystalline ceramic particles dispersed in the metal layer. Further, the melting point of the ceramic particles is higher than the melting point of the metal constructing the metal layer. Accordingly, it is possible to bake the metal layer on the surface of the fluorescent body in a state that the heating is performed up to a temperature higher than the melting point of the metal constructing the metal layer. With this, it is possible to enhance the adhesion strength of the reflective film. Note that even in the case that the metal layer is baked on the surface of the fluorescent body in the state that the heating is performed up to the temperature higher than the melting point of the metal constructing the metal layer, since the ceramic particles do not melt and do not fluidly move, the ceramic particles do not gather to the interface between the reflective film and the fluorescent body, which in turn makes it possible to disperse the ceramic particles in the molten metal. Since the ceramic particles are dispersed in the molten metal, the viscosity of the molten metal is increased, thereby making it possible to maintain a shape of the film. With this, it is possible to suppress any lowering in the reflectivity of the reflective film.

FIG. 2 is a flow chart indicating a method of producing a wavelength conversion member 1.

Figure 1:
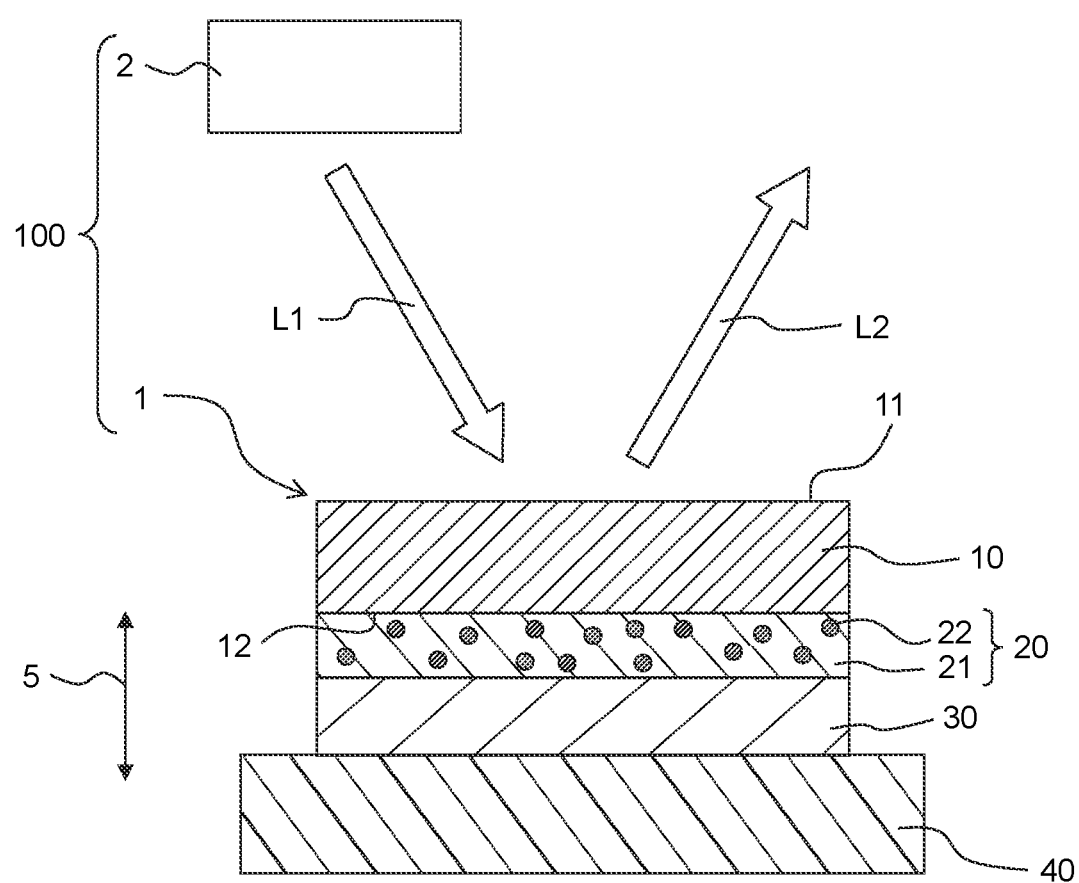
FIG. 1 is a schematic view of a light source apparatus 100.

A light source apparatus 100 according to an embodiment of the present disclosure will be explained. Note that in the following explanation, an up-down direction (corresponding to a "first direction" of the present disclosure) is defined with a state that the light source apparatus 100 is installed to be usable (a state depicted in FIG. 1), as the reference. As depicted in FIG. 1, the light source apparatus 100 according to the present embodiment is provided with a wavelength conversion member 1 and a light source 2. The light source 2 is a LED (Light Emitting Diode) or a LD (Laser Diode), and emits a light L1 in a predetermined wavelength region. The wavelength conversion member 1 includes a fluorescent body 10 which will be described later on. In a case that the light L1 comes into the fluorescent body 10, the fluorescent body 10 emits a light of a wavelength which is different from that of the light L1, as fluorescence. In the wavelength conversion member 1, the fluorescent emitted by the fluorescent body 10 is radiated, as a light L2, in a predetermined direction together with the light L1 which has not contributed to the generation of the fluorescence in the fluorescent body 10. As depicted in FIG. 1, the light source apparatus 100 of the present embodiment is a light source apparatus of the reflective type, and is usable in a variety of kinds of optical devices such as a head lamp, an illumination device, a projector, etc.

The wavelength conversion member 1 is provided with the fluorescent body 10, a reflective film 20, a joining layer 30 and a heat-dissipating member 40. As depicted in FIG. 1, the fluorescent body 10, the reflective film 20, the joining layer 30 and the heat-dissipating member 40 are stacked in this order in the up-down direction.

The fluorescent body 10 is a ceramic sintered body which has a shape of a plate and which is provided with a fluorescent phase including crystal particles having the fluorescence (fluorescence property), and a translucent phase including crystal particles (crystal grains) having the translucency. In the following explanation, an upper surface (a surface on the opposite side to the reflective film 20) of the fluorescent body 10 is referred to as a first surface 11, and a lower surface (a surface facing or opposed to the reflective film 20) of the fluorescent body 10 is referred to as a second surface 12. The fluorescent phase of the fluorescent body 10 absorbs the light L1 coming thereinto from the first surface 11, and emits a light of a different wavelength from that of the light L1. In other words, with the light L1 coming into the fluorescent phase of the fluorescent body 10 as an excitation light, the fluorescent phase emits fluorescent of a different wavelength from that of the excitation light.

It is possible that the crystal particles of the translucent phase has a composition represented by a chemical formula $Al_2O_3$, and that the crystal particles of the fluorescent phase has a composition represented by a chemical formula $A_3B_5O_{12}$:Ce (a so-called garnet structure). Note that "$A_3B_5O_{12}$:Ce" indicates that Ce is solid-dissolved in $A_3B_5O_{12}$ and that a part of the element A is substituted for Ce.

Each of the element A and the element B in the chemical formula "$A_3B_5O_{12}$:Ce" is composed of at least one kind of element selected from the following element groups as follows.

Element A: lanthanoid which is different from Sc, Y and Ce (note that, however, Gd may be further included, as the element A).

Element B: Al (note that, however, Gd may be further included, as the element B).

By using the ceramic sintered body as the fluorescent body 10, the light is scattered in the interface between the fluorescent phase and the translucent phase, thereby making it possible to reduce the angle dependency of the color of the light. With this, it is possible to improve the color uniformity.

As depicted in FIG. 1, the reflective film 20 is stacked on the second surface 12 of the fluorescent body 10. The reflective film 20 reflects a light passing through the fluorescent body 10 and a light generated in the fluorescent body 10. The reflective film 20 is provided with a metal layer 21 (for example, silver (Ag), platinum (Pt), aluminum (Al), silver alloy, etc.), and a plurality of crystalline oxide particles 22 which are dispersed in the inside of the metal layer 22. The crystalline oxide particles 22 are an example of "crystalline ceramic particles" of the present disclosure. Note that the crystalline oxide particles 22 are, for example, crystal of $Al_2O_3$, YAG, $TiO_2$, $Y_2O_3$, $SiO_2$, $Cr_2O_3$, $Nb_2O_5$, $Ta_2O_5$, etc., and do not include amorphous oxide particles such as glass.

The joining layer 30 is arranged between the reflective film 20 and the heat-dissipating member 40, and is formed of an AuSn solder including gold (Au) and tin (Sn). The joining layer 30 joins the fluorescent body 10 and the heat-dissipating member 40 and transmits the heat generated in the fluorescent body 10 to the heat-dissipating member 40.

The heat-dissipating member 40 is a member having a shape of a flat plate and formed, for example, of a material which has a thermal conductivity higher than that of the fluorescent body 10, and which is exemplified, for example, by copper, a copper-molybdenum alloy, a copper-tungsten alloy, aluminum, aluminum nitride, etc. The heat-dissipating member 40 dissipates, to the outside, the heat of the fluorescent body 10 transmitted thereto via the joining layer 30.

EXAMPLES

In the following, the present disclosure will be further explained by using examples. Note that, however, the present disclosure is not limited to or restricted by the examples to be explained below.

Example 1

In Example 1, the wavelength conversion member 1 was produced by the following procedure (see FIG. 2). First, the materials were weighed so that the ratio of the fluorescent phase to the translucent phase became to be 6:4 (step S11). Next, the weighed materials were charged into a ball mil together with ethanol, and was subjected to a crushing and mixing for 16 hours (step S12) so as to obtain a slurry. Note that pure water (purified water) may be used, instead of using the ethanol. Next, the slurry obtained by the crushing and mixing was dried and granulated, and then a binder and water were added thereto (step S13). Next, mixing (kneading) was performed while applying a shearing force so as to thereby produce a clay (kneaded clay) which was then molded into a sheet shape by an extrusion molding apparatus (step S14). The produced molding (compact) undergoes sintering in the ambient atmosphere at approximately 1700° C. (step S15). The obtained sintered body was cut to have a thickness of 250 μm, was subjected to a mirror finish for a surface thereof, thereby producing a fluorescent body 10.

An acrylic based binder and a solvent were added to silver (Ag) powder (average particle diameter: in a range of approximately 1 μm to approximately 100 μm) and alumina ($Al_2O_3$) powder (average particle diameter: in a range of approximately 0.1 μm to approximately 10 μm) and was subjected to mixing (step S16). In a case of mixing the alumina powder and the silver powder, the alumina powder is adjusted to have a volume ratio preferably in a range of approximately 3% to approximately 50%, more preferably in a range of approximately 5% to approximately 20%. In Example 1, the alumina powder was adjusted to have a volume ratio of approximately 5%. Next, the obtained slurry was coated on the second surface 12 of the fluorescent body 10, and was dried (step S17). Then, heating was performed in the ambient atmosphere up to a temperature not less than the melting point (961.8° C.) of the silver (for example, up to 1000° C.) (step S18). With this, the reflective film 20 was formed on the second surface 12 of the fluorescent body 10.

Further, in a state that a foil of AuSn solder, as the joining layer 30, was sandwiched between the heat-dissipating member 40 and the fluorescent body 10 having the reflective film 20 formed on the second surface 12, the fluorescent body 10 and the heat-dissipating member 40 were charged to a reflow furnace, thereby joining the wavelength conversion member 1 and the heat-dissipating member 40 (step S19). With this, a wavelength conversion member 1 which is a joined body of the fluorescent body 10 and the heat-dissipating member 40 was produced. As described above, since the alumina powder of which average particle diameter is in the range of approximately 0.1 μm to approximately 10 μm was used, the average particle diameter of the alumina particles dispersed in the reflective film 20 of the produced wavelength conversion member 1 was in a range of approximately 0.1 μm to approximately 10 μm.

Note that in Example 1, in the formation of the reflective film 20, the heating was performed up to the temperature not less than the melting point of the silver. Note that the melting point of the alumina is 2072° C. which is very high, and the heating was performed not up to the melting point of the alumina in the formation of the reflective film 20. Accordingly, in the formation of the reflective film 20, although the silver particles are melted and the molten silver fluidly moves, the alumina particles do not fluidly move due to the crystallinity thereof. Due to this, the alumina particles do not gather in the interface between the reflective film 20 and the fluorescent body 10, thereby making it possible to disperse the alumina particles in the molten silver. With this, it is possible to suppress any lowering in the reflectivity of the reflective film 20 which would be otherwise caused due to the gathering of the alumina particles to the interface between the reflective film 20 and the fluorescent body 10. Further, since the alumina particles dispersed in the inside of the reflective film 20 has a high translucency, it is possible to suppress any reduction in the amount of light due to the absorption of the light by the alumina particles.

In Example 1, the silver is baked on the surface of the fluorescent body 10 at a high temperature in the formation of the reflective film 20. Accordingly, it is possible to greatly enhance the adhesion strength between the reflective film and the surface of the fluorescent body, as compared with a case that a reflective film 20 of the silver is formed by the vapor deposition. Further, it is possible to form a thick reflective film, as compared with the case that the reflective film 20 of the silver is formed by the vapor deposition. Generally, in a case that the reflective film 20 of the silver is formed on the surface of the fluorescent body 10 by the vapor deposition, the limit for the thickness of the reflective film 20 of the silver is several hundred nm. In contrast, in a case that the reflective film 20 of the silver is baked on the surface of the fluorescent body 10 as described above, it is possible to make the thickness of the reflective film 20 be great, as compared with the case that the reflective film is formed by the vapor deposition. In Example 1, a reflective film 20 of which thickness is in a range of 5 μm to 10 μm was formed. Further, in the case that the reflective film 20 of the silver is baked on the surface of the fluorescent body 10 as described above, it is possible to form the reflective film 20 cheaply, as compared with the case that the reflective film is formed by the vapor deposition.

Note that in a case that, in the formation of the reflective film 20 as described above, only the silver particles are mixed, without mixing the alumina particles, the silver, which is melt during the heating up to the temperature not less than the melting point of the silver partially aggregates, in some cases. In a case that the molten silver partially aggregates in such a manner, it becomes difficult to spread the silver in the entirety of the second surface 12 of the fluorescent body 10. In contrast, in a case that the alumina particles are dispersed in the molten silver, as in the present example, the viscosity of the molten Ag is increased, which in turn inhibits the molten silver from partially aggregate, thereby making it possible to spread the molten silver in the entirety of the second surface 12 of the fluorescent body 10.

Example 2

In Example 2, a wavelength conversion member 1 was produced in a method of production similar to that in Example 1, except that the oxide particles which are dispersed in the inside of the metal layer 22 are cerium-activated yttrium-aluminum-garnet (YAG:Ce) particles, rather than the alumina particles. In the following explanation, the cerium-activated yttrium-aluminum-garnet (YAG:Ce) particles are simply referred to as "YAG particles".

Also in Example 2, the silver is baked on the surface of the fluorescent body 10 in the case of forming the reflective film 20, similarly to Example 1. Accordingly, it is possible to greatly enhance the adhesion strength between the reflective film and the surface of the fluorescent body, as compared with a case that a reflective film 20 of the silver is formed by the vapor deposition; and it is also possible to form a thick reflective film having a thickness in a range of 5 μm to 100 μm. Further, similarly to the alumina particles, since the YAG particles serve like nuclei which attract the molten silver, it is possible to inhibit partial aggregation of the molten silver and to spread the molten silver in the entirety of the second surface 12 of the fluorescent body 10.

Note that the YAG particles are a fluorescent body which absorbs the blue light and emits the yellow light. Accordingly, by dispersing the YAG particles in the inside of the reflective film 20, it is possible to increase an amount of the light in the inside of the reflective film 20.

Example 3

In Example 3, a wavelength conversion member 1 was produced in a method of production similar to that in Example 1, except that alumina powder having an average particle diameter in a range of approximately 5 μm to 50 μm was used in the mixing of the alumina powder and the silver powder, and that a reflective film 20 having a thickness in a range of 10 μm to 150 μm was formed. Since the alumina powder having the average particle diameter in the range of approximately 5 μm to 50 μm was used, the average particle diameter of the alumina particles dispersed in the reflective film 20 of the produced wavelength conversion member 1 was in a range of approximately 5 μm to 50 μm. It was confirmed that the wavelength conversion member 1 of Example 3 also exhibited a similar effect to that of the wavelength conversion member 1 of Example 1.

Operation and Technical Effect of Embodiment

The wavelength conversion member 1 according the present embodiment has the fluorescent body 10 which emits the fluorescence by the excitation light L1 and the reflective film 20 arranged on the side of the second surface 12 of the fluorescent body 10. With this, for example as depicted in FIG. 1, a light radiated in a direction different from the direction in which the light L2 is radiated (for example, a light travelling downward) is reflected upward by the reflective film 20, thereby making it possible to increase the amount of the light radiated from the wavelength conversion member 1. Further, the reflective film 20 has the metal layer 21 such as the silver, etc., and the crystalline oxide particles 22 which are dispersed in the inside of the metal layer 21. Furthermore, the melting point of the oxide particles 22 is higher than the melting point of the metal constructing the metal layer 21. Accordingly, it is possible to bake the metal layer on the surface of the fluorescent body 10 in a state that the heating is performed up to the temperature higher than the melting point of the metal constructing the metal layer 21. With this, it is possible to enhance the adhesion strength of the reflective film 20 with respect to the fluorescent body 10. Note that even in the case that the metal layer 21 is baked on the surface of the fluorescent body 10 in a state that the heating is performed up to the temperature higher than the melting point of the metal constructing the meal layer 21, the oxide particles 22 are not melt and do not fluidly move, and thus the oxide particles 22 do not gather to the interface between the reflective film 20 and the fluorescent body 10, which in turn makes it possible to disperse the oxide particles in the molten metal. Since the oxide particles 22 are dispersed in the molten metal, the viscosity of the molten metal is increased, thereby making it possible to suppress such a situation that the molten metal partially aggregates. With this, it is possible to suppress any lowering in the reflectivity of the reflective film 20.

In the above-described embodiment, the oxide particles 22 (for example, the alumina particles or the YAG particles) has the translucency. With this, it is possible to suppress any lowering in the amount of the light due to the absorption of the light by the oxide particles 22. Further, the oxide particles having the translucency are exemplified, for example, by $TiO_2$, $Y_2O_3$, $SiO_2$, $Cr_2O_3$, $Nb_2O_5$, $Ta_2O_5$, etc., other than the alumina particles and the YAG particles.

In the above-described embodiment, in a case that the oxide particles 22 are the oxide particles which emit a light by the excitation light (for example, the YAG particles), since the oxide particles 22 emit the light, it is possible to increase the amount of the light in the inside of the reflective film 20. Further, the light-emitting oxide particles are exemplified, for example, by LuAG (lutetium aluminum garnet), etc., other than the YAG particles.

In the above-described embodiment, the wavelength conversion member 1 is provided with the heat-dissipating member 40 which dissipates or releases the heat of the fluorescent body 10 to the outside. With this, in the fluorescent body 10, it is possible to effectively dissipate the heat, which is generated in a case that the fluorescence is emitted by the excitation light, to the outside, thereby making it possible to suppress any quenching due to the increase in the temperature of the fluorescent body 10. Accordingly, it is possible to suppress any lowering in the amount of the light radiated from the wavelength conversion member 1.

In the above-described embodiment, the light source apparatus 100 is provided with the light source 2 which irradiates the fluorescent body 10 with the light L1. As described above, the reflective film 20 can be configured to have the thickness which is great as compared with a reflective film formed by the vapor deposition, which in turn makes it possible to increase the adhesion strength of the reflective film 20 with respect to the fluorescent body 10. With this, since it is possible to improve the thermal resistance of the reflective film 20, it is possible to increase the luminance of the light L1 coming into the fluorescent body 10, thereby making it possible to improve the light emission intensity of the light source apparatus 100.

Modifications

The above-described embodiment and examples are merely exemplary, and may be changed as appropriate. For example, the material of each of the fluorescent body 10 and the reflective film 20 is not limited to or restricted by the above-described material, and a suitable material may be used. The joining layer 30 is not limited to the AuSn solder formed of the gold and the tin, and may be a solder formed of another material or other materials, or may be obtained by baking fine powder, for example, of silver, copper (Cu), etc. The heat-dissipating member 40 may be a member having a single-layered structure made of the above-described material, or may be a member having a multi-layered structure made of a same kind of material or different materials. Further, it is also allowable to perform plating on a surface of the heat-dissipating member 40 with gold, nickel, etc. Furthermore, it is also allowable to form a metal layer (for example, a thin film of gold (Au), a thin film of nickel (Ni), etc.) between the joining layer 30 and the reflective layer 20 in order to increase the adhesiveness with respect to the joining layer 30 and/or to prevent the oxidation of the reflective film 20.

In the above-described embodiment, although the metal layer 21 of the reflective film 20 is formed of the silver, the present disclosure is not limited to such an aspect. It is allowable to use, as the metal layer 21, a metal different from the silver (for example, an alloy such as a silver alloy, platinum, aluminum, etc.).

In the above-described embodiment, although the alumina particles or the YAG particles are used as the crystalline oxide particles included in the reflective film 20, the present disclosure is not limited to such an aspect. It is not necessarily indispensable that the particles dispersed in the inside of the metal layer 21 of the reflective film 20 are the alumina particles or the YAG particles; it is allowable that the particles dispersed in the inside of the metal layer 21 of the reflective film 20 are crystalline ceramic particles having a melting point higher than the melting point of the metal constructing the metal layer 21 of the reflective film 20. The crystalline ceramic particles are exemplified, for example, by: particles of a suitable oxide which are different from the alumina particles and the YAG particles, a suitable nitride, a suitable carbide, a suitable boride, a metallic particles of which surface is ceramicized, etc. Note that the crystalline ceramic particles do not include the amorphous oxide particles such as the glass, as described above.

The oxide particles are stable in the ambient atmosphere. Accordingly, in a case that crystalline oxide particles are used, as the crystalline ceramic particles, as in the above-described embodiment, it is possible to perform the baking in the ambient atmosphere in which the baking temperature (burning temperature) can be easily adjusted, as in the above-described step S18.

It is possible to use particles of the ceramic sintered body constructing the fluorescent body 10, as the crystalline ceramic particles. In a case that there is any difference between the coefficient of thermal expansion of the reflective film 20 and the coefficient of thermal expansion of the fluorescent body 10, there is such a fear that the reflective film 20 and the fluorescent body 10 might exfoliate from each other, accompanying with the generation of heat occurring in the course of using the wavelength conversion member 1. In contract, in a case of using, as the crystalline ceramic particles, the particles of the ceramic sintered body constructing the fluorescent body 10, it is possible to make the difference between the coefficient of thermal expansion of the reflective film 20 and the coefficient of thermal expansion of the fluorescent body 10 be small, as compared with another case in which the particles of the ceramic sintered body constructing the fluorescent body 10 are not used as the crystalline ceramic particles, thereby making it possible to suppress the exfoliation between the reflective film 20 and the fluorescent body 10. Further, in a case that the ceramic particles make contact with the fluorescent body, there is such a possibility that the composition of each of the ceramic particles and the fluorescent body might be changed. However, in a case that the particles of the ceramic sintered body constructing the fluorescent body 10 are used as the crystalline ceramic particles, it is possible to suppress such a change in the composition.

Furthermore, in the above-described embodiment, although the reflective film 20 is directly baked on the second surface 12 of the fluorescent body 10, the present disclosure is not limited to such an aspect. For example, it is allowable to form an adhesive film (tight contact film), an enhanced reflection film, etc., between the second surface 12 of the fluorescent body 10 and the reflective film 20. The adhesive film and the enhanced reflection film may be formed, for example, of a niobium oxide, a titanium oxide, a lanthanum oxide, a tantalum oxide, an yttrium oxide, a gadolinium oxide, a tungsten oxide, a hafnium oxide, an aluminium oxide, a silicon oxide, a chromium oxide, etc. Note that each of the adhesive film and the enhanced reflection film may be a single-layered film formed of the above-described material, or may be a multi-layered film formed of a same kind of material or different materials. Even in a case that such an enhanced reflection film is formed on the second surface 12 of the fluorescent body 10, it is possible to strengthen the adhesive strength of the reflective film 20 with respect to the fluorescent body 10 (and with respect to the enhanced reflection film), similarly to Examples 1 and 2 as described above.

In the foregoing, although the explanation has been given by using the embodiment and the modifications thereof of the present disclosure, the technical scope of the present disclosure is not limited to the scope or range of the above-described description. It is apparent to a person skilled in the art that various changes or improvement can be made to the above-described embodiment and the modifications thereof. It is apparent, also from the description of the claims, to the person skilled in the art that an aspect obtained by adding such a change or improvement may also be included in the technical scope of the present disclosure.

The order of executing of the respective processings in the production method indicated in the specification and in the drawings can be executed in an arbitrary order, unless the order is clearly described, and/or unless the output of a preceding processing is used in a succeeding processing. Even in a case that the explanation is given by using, for the sake of convenience, the terms such as "at first", "first", "next", "then", etc., it is not meant that it is necessarily indispensable that the respective processings are executed in this order.

What is claimed is:

1. A wavelength conversion member comprising:
   a fluorescent body configured to emit fluorescence by an excitation light and having an incident surface into which the excitation light comes and a rear surface which faces the incident surface; and
   a reflective film arranged on a side of the rear surface of the fluorescent body and including a metal layer and ceramic particles dispersed in the metal layer,
   wherein the ceramic particles are crystalline, and a melting point of the ceramic particles is higher than a melting point of a metal constructing the metal layer.

2. The wavelength conversion member according to claim 1, wherein the ceramic particles are oxide particles.

3. The wavelength conversion member according to claim 1, wherein the ceramic particles have a translucency.

4. The wavelength conversion member according to claim 1, wherein the ceramic particles are oxide particles which is configured to emit a light by the excitation light.

5. The wavelength conversion member according to claim 1, wherein the ceramic particles are particles of a ceramic sintered body constructing the fluorescent body.

6. The wavelength conversion member according to claim 1, further comprising a heat-dissipating member which is arranged in the reflective film on a side opposite to the fluorescent body and which is configured to dissipate a heat of the fluorescent body.

7. A light source apparatus comprising:
   the wavelength conversion member as defined in claim 6; and
   a light source configured to irradiate the incident surface of the fluorescent body with the excitation light.

* * * * *